(12) United States Patent
Smith et al.

(10) Patent No.: US 6,645,334 B1
(45) Date of Patent: Nov. 11, 2003

(54) TIRE MANUFACTURING USING A ROLL FORMING APPARATUS

(75) Inventors: Michael Wallace Smith, Mogodore, OH (US); Michael Raymond Dzurko, Massillon, OH (US); Patrick David Marks, Uniontown, OH (US); William James Head, Ravenna, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/869,234

(22) PCT Filed: Jan. 26, 1999

(86) PCT No.: PCT/US99/01538

§ 371 (c)(1),
(2), (4) Date: Jun. 25, 2001

(87) PCT Pub. No.: WO00/44547

PCT Pub. Date: Aug. 3, 2000

(51) Int. Cl.⁷ .......................... B29D 30/70; B29G 47/02
(52) U.S. Cl. ................. 156/124; 152/532; 156/130; 156/133; 156/199; 156/212; 156/244.25
(58) Field of Search ................. 156/123, 124, 156/130, 117, 133, 199, 212, 213, 216, 244.25, 269, 406.4, 110.1; 152/532, 526, 535

(56) References Cited

U.S. PATENT DOCUMENTS

| | | |
|---|---|---|
| 2,649,134 A | 8/1953 | Steinle |
| 3,763,913 A | 10/1973 | French et al. |
| 3,799,233 A | 3/1974 | Cappa |
| 4,090,835 A | 5/1978 | Bronson, Jr. et al. |
| 4,283,241 A | 8/1981 | Hollmann |
| 4,286,645 A | 9/1981 | Boileau |
| 4,425,953 A | 1/1984 | Rohde et al. |
| 4,609,336 A | 9/1986 | Stevenson et al. |
| 4,990,203 A | 2/1991 | Okada et al. |
| 5,042,546 A * | 8/1991 | Forney et al. ............... 152/526 |
| 5,162,070 A | 11/1992 | Meyer |
| 5,215,612 A * | 6/1993 | Motomura et al. ...... 156/110.1 |
| 5,458,727 A | 10/1995 | Meyer |
| 5,779,828 A * | 7/1998 | Okamoto .................... 152/532 |

FOREIGN PATENT DOCUMENTS

| | | |
|---|---|---|
| EP | 0724951 | 8/1996 |
| FR | 2348067 | 11/1977 |

* cited by examiner

*Primary Examiner*—Geoffrey L. Knable
(74) *Attorney, Agent, or Firm*—Howard M. Cohn

(57) ABSTRACT

A method for applying a plurality of reinforcement belts upon a toroidal tire carcass (50). First and second reinforcement belts (56, 60) are first wrapped around the tire carcass. Then a first belt assembly (68) of a third reinforced belt (69) with elastomeric wedges (72a, 72b) embedded into side edges (70a, 70b) of the third belt is wrapped around the second belt (60) so that the side edges (62a, 62b) of the second belt are spaced from the side edges (70a, 70b) of the third belt. An outer belt (74) and a tread (80) are applied about the third belt, and the tire carcass is ready to be cured in a tire mold.

17 Claims, 4 Drawing Sheets

TIRE MANUFACTURING USING A ROLL FORMING APPARATUS

TECHNICAL FIELD

This invention relates to the building of pneumatic tires. More particularly it relates to a step in the construction of a belted radial ply pneumatic tire wherein three or more cord reinforced belts are positioned between a tire carcass and a tire tread, and wherein wedges of uncured rubber are applied along the edges of at least one of the intermediate belts to reduce ply separation between the edges of adjacent belts.

BACKGROUND OF THE INVENTION

The construction of a radial ply tire involves the fabrication of a tire carcass with bead rings and sidewalls on a cylindrical drum followed by forming the carcass into toroidal shape. One or more reinforced belts are wrapped sequentially around the outer circumference of the carcass after which a tread is applied to the carcass on top of the reinforced belt or belts. The 'green' or uncured tire is then transferred to a tire mold where it is formed under pressure into a final shape and then cured or vulcanized.

Each reinforced belt is made from a plurality of closely spaced cords embedded in uncured rubber, the cords extending at an angle of about 18° to 26° with respect to the equatorial plane of the tire. When two belts are used, the cord angles are equal but aligned in opposite directions with respect to the equatorial plane. Inasmuch as the cords are not parallel to the equatorial plane, the ends of the cords are exposed along the edges of the belts. The cords used in belts may comprise nylon, polyester, rayon, cotton, aramid or steel.

The exposed cord ends along the edges of the belts create discontinuities which can potentially cause problems such as ply separations, air entrapment and other irregularities in a finished tire. The previously mentioned potential problems are more likely to occur when steel cords are used for the belt reinforcement. Conventionally, a good adhesive bond between rubber and steel is achieved by plating the steel with brass, the latter forming a secure bond with the rubber. Problems arise, however, when the cut ends of the steel cords terminate along the edge of the belt because these ends are not plated. Thus, separation between the rubber and the ends of the steel cord is more likely to occur, thereby giving rise to one or more of the aforementioned problems.

In the construction of light and intermediate-duty tires, such as truck tires, three or four belts may be placed between the tire carcass and the tread. When a tire having three or four belts rolls along the ground, the cord angle in each belt has a tendency to change as the belt moves through the tire footprint (the contact area between the tire tread of the moving tire and the surface on which it is rolling). The cord shift is most pronounced in the middle belt or belts. Thus, when three belts are used in the tire construction, the shift is noted mostly between the $1^{st}$ and $2^{nd}$ belt. When four belts are used, the change in cord angle is most pronounced between the $2^{nd}$ and $3^{rd}$ belts because the latter adjacent belts have cords at opposite angles. This shift in cord angle can cause the reinforcing cords in the belt to pull loose from the rubber in which the cords are encapsulated.

One solution to these potential problems is to embed each edge of the middle or intermediate belt or belts in a wedge-shaped strip of uncured rubber. The rubber wedge is typically prepared by extrusion of a continuous length of uncured rubber at a location remote from the tire building operation. The extruded rubber wedge is cooled and rolled onto a storage spool with an intermediate plastic sheet serving as a barrier between adjacent folds of the wedge. The diameter of the storage spool is substantially less than the outer diameter of the tire carcass around which the wedge is eventually wrapped. The wedge is later unrolled and two strips of the wedge are applied separately to the edges of a belt to embed the exposed cord ends. This additional manufacturing step adds to the labor and expense of building a pneumatic tire.

The rolled wedge on the storage spool begins to age or cure in storage and thereby decreases its ability to bond to and encapsulate the edges of the belts. Furthermore, the wedge begins to degrade as it develops wrinkles, internal stresses, folds and deformation while stored on the spool. Due to the relatively small size of the wedge, it does not lend itself to being hauled with automatic pick-up and application equipment. Also, the tail end of the wedge must be re-aligned on the belt and manually spliced to the front end of the wedge during application. Furthermore, the wedge being stretched and compressed during application to the belt, creates a non-uniform gage or spacing between the edges of one belt and the next adjacent belt above or below it, thereby contributing to non-uniformities within the tire.

The direct extrusion of a cushion gum strip on to a rotating tire carcass in retreading operations has previously been described in various prior art patent such as U.S. Pat. No. 5,162,070 and U.S. Pat. No. 5,458,727.

The placement of uncured, wedge-shaped strips directly to a tire carcass during the fabrication of a new tire is shown in U.S. Pat. No. 4,283,241. The wedge strips are associated with the formation of the sidewalls of the tire and are not used to embed the ends of the belts beneath the tire tread.

U.S. Pat. No. 2,649,134 describes the application of a protective neoprene cover over the sidewall of a tire, preferably by calendering a thin layer of neoprene stock in heated condition on to the sidewall and firmly pressing them together.

None of these prior art references are directed at the aforementioned problems associated with the use of wedge strips along the edges of the belts in new tire construction.

OBJECTS AND SUMMARY OF THE INVENTION

It is an object of the present invention to provide a method for making a belt assembly from a cord reinforced belt and wedges of uncured rubber for use in the construction of pneumatic tires as defined in one or more of the appended claims and as such having the capability of accomplishing one or more of the following subsidiary objects.

Another object of the present invention is to provide a method for improving the uniformity and repeatability of producing light to intermediate duty truck tires; Yet another object of the present invention is to improve the rate of manufacture of reinforced belt assemblies for pneumatic tires, while at the same time reducing the labor time and expense of this procedure.

Still another object of the present invention is to provide a technique for decreasing the rate of failure along the side edges of the intermediate belt or belts in light and intermediate duty truck tires.

These and other objects which will become readily apparent from the following description are achieved in the manner to be hereinafter described.

The present invention relates to a method for constructing a cord reinforced belt assembly used in the construction of a pneumatic tire, comprising the steps of extruding at least one, and preferably two wedges of uncured rubber, preferably gum rubber; depositing one wedge of uncured rubber along each side edge of a length of belt reinforced with cords of metal such as brass plated steel, or of fibers of nylon, rayon, cotton, aramid or polyester; roll forming the wedges of rubber along the side edges of the reinforced belt material to embed each side edge in rubber wedge, and cutting the belt and the wedges to form a belt assembly having two ends. The wedges are extruded and then roll formed on to the edges of the belt at a temperature of between 77° C. and 115° C. The reinforcing cords in the belt material form an angle of between 18° and 26°, and preferably between 21° and 23° with respect to the equatorial plane of the tire. The tire preferably has a belt assembly that contains three or four reinforced belts with one of the intermediate belt or belts roll formed with the wedges of the invention. In a tire having four reinforced belts, the cords in the second belt are disposed at a cord angle which is equal and opposite to the cord angle in the third belt, with respect to the equatorial plane of the tire and the wedges are provided between the second and third belt.

Another aspect of the invention relates to a method for applying at least four reinforcing belts onto a toroidal tire carcass. The method comprises the steps of; extruding a pair of uncured elastomeric wedges; depositing one of the elastomeric wedges along each side edge of a length of cord reinforced belt material; roll forming the elastomeric wedges and side edges to embed each side edge of the belt into one of the wedges; cutting the belt to a length equal to the circumference of the carcass; and wrapping the belt with the elastomeric wedges around the carcass so that the wedges are between the second and third belts. The wedges are extruded and roll formed at a temperature in the range or between 77° C. and 115° C. and at pressures of between 1400 and 2200 psi (9653 and 15170 kPa). The belts preferably are reinforced with steel cords, typically plated with brass or with cords of a suitable natural or synthetic material such as nylon, polyester, cotton, rayon or aramid.

Other objects, features and advantages of the invention will become apparent to those skilled in the art to which it pertains upon a reading and understanding of the following detailed description.

BRIEF DESCRIPTION OF THE DRAWINGS

The structure, operation and advantages of the invention will become further apparent upon consideration of the following description taken in conjunction with the accompanying drawings wherein.

DEFINITIONS

For purposes of the detailed description, the following terms shall have the definitions set beside them unless clearly contraindicated elsewhere in the text.

"Belt" means at least a ply of parallel cords underlying the tread and having cord angles which are nearly parallel with respect to the equatorial plane of the tire.

"Casing" means the tire apart from the tread and belts, and including the beads.

"Footprint" means the contact area of the tire tread with a flat surface at zero speed and under normal load pressure.

"Radial direction" means the direction radially toward or away from the axis of rotation of a tire.

"Reinforcing cords" means cords made from natural or synthetic fibers such as cotton, rayon, polyester, nylon or aramid, or from steel or other metal wires or filaments which are braided, twisted or woven together.

"Splice" means a joint formed between two ends of a belt, a belt assembly or a tread to form a continuous loop or circle.

"Tread" means the portion of the tire radially outside of the carcass for rolling contact with the surface of a road.

"Wedge strip" means a generally triangular cross sectional rubber strip which fills the spaces between the side edges of adjacent reinforcement belts and which embeds the side edges of the belts.

DETAILED DESCRIPTION OF THE INVENTION

Figure 1:
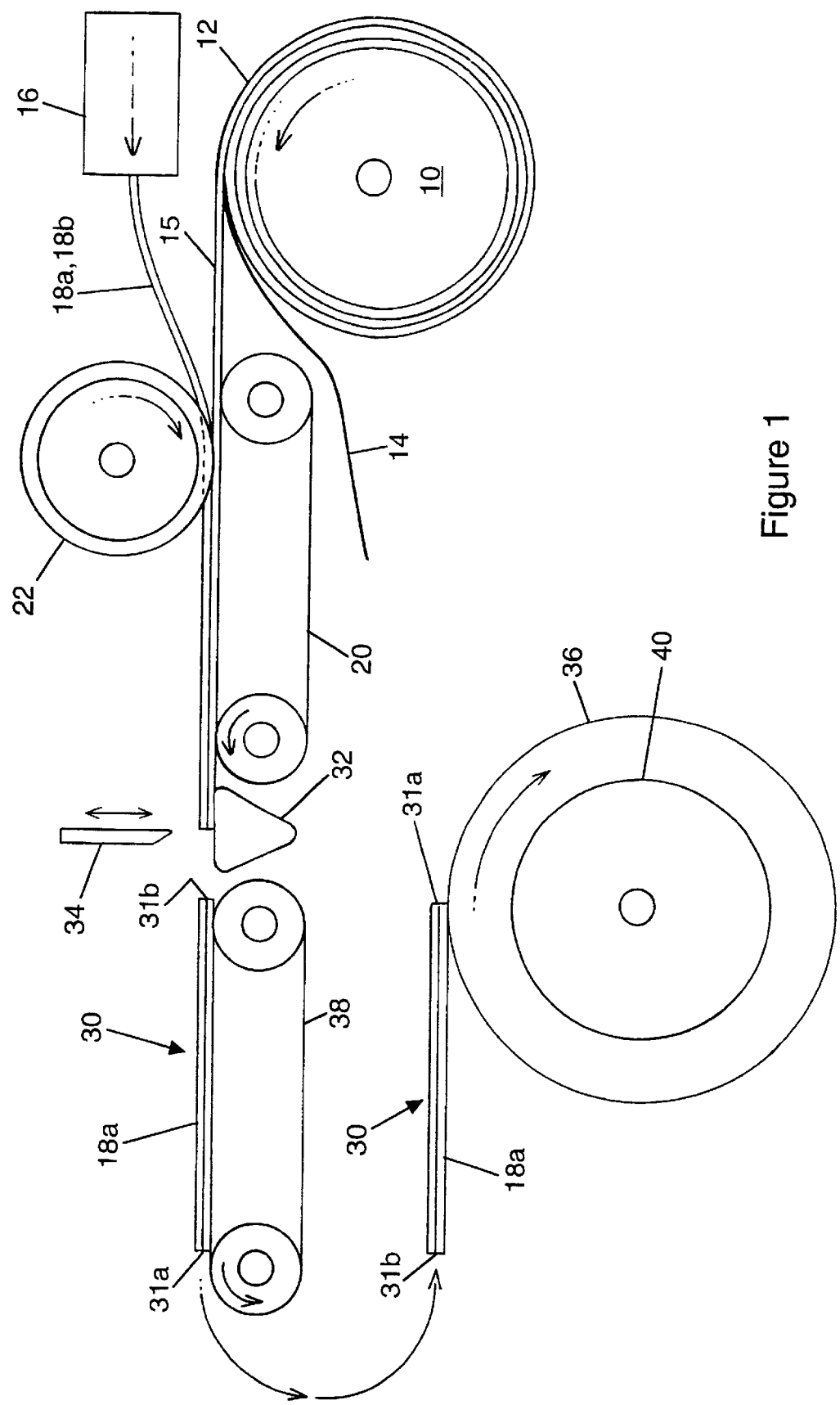
FIG. 1 is a schematic diagram showing the steps of forming and delivering a belt assembly to a tire building drum.

FIG. 1 is a schematic diagram which shows the operative steps of practicing the present invention. A spool 10 has a roll of reinforced belt material 12 coiled thereon. An inner liner 14 of a suitable nonstick material such as polyethylene separates each layer of the belt material from the next layer. An extruder or pair of extruders 16 (one of which is shown) extrude substantially identical wedges 18a,18b of gun rubber. The wedges 18a,18b are extruded with a triangular cross-section and each deposited along one side edge 24a, 24b, respectively of the belt material 12 as the latter is laid down on a conveyor belt 20. A cylindrical roll former 22 presses the edges 18a,18b and the belt material 12 together so that the side edges 24a,24b of he belt material is embedded into the wedge material. The belt material, being relatively stiff as compared with the wedge material, displaces a section of the wedge as shown in FIG. 2.

Figure 2:
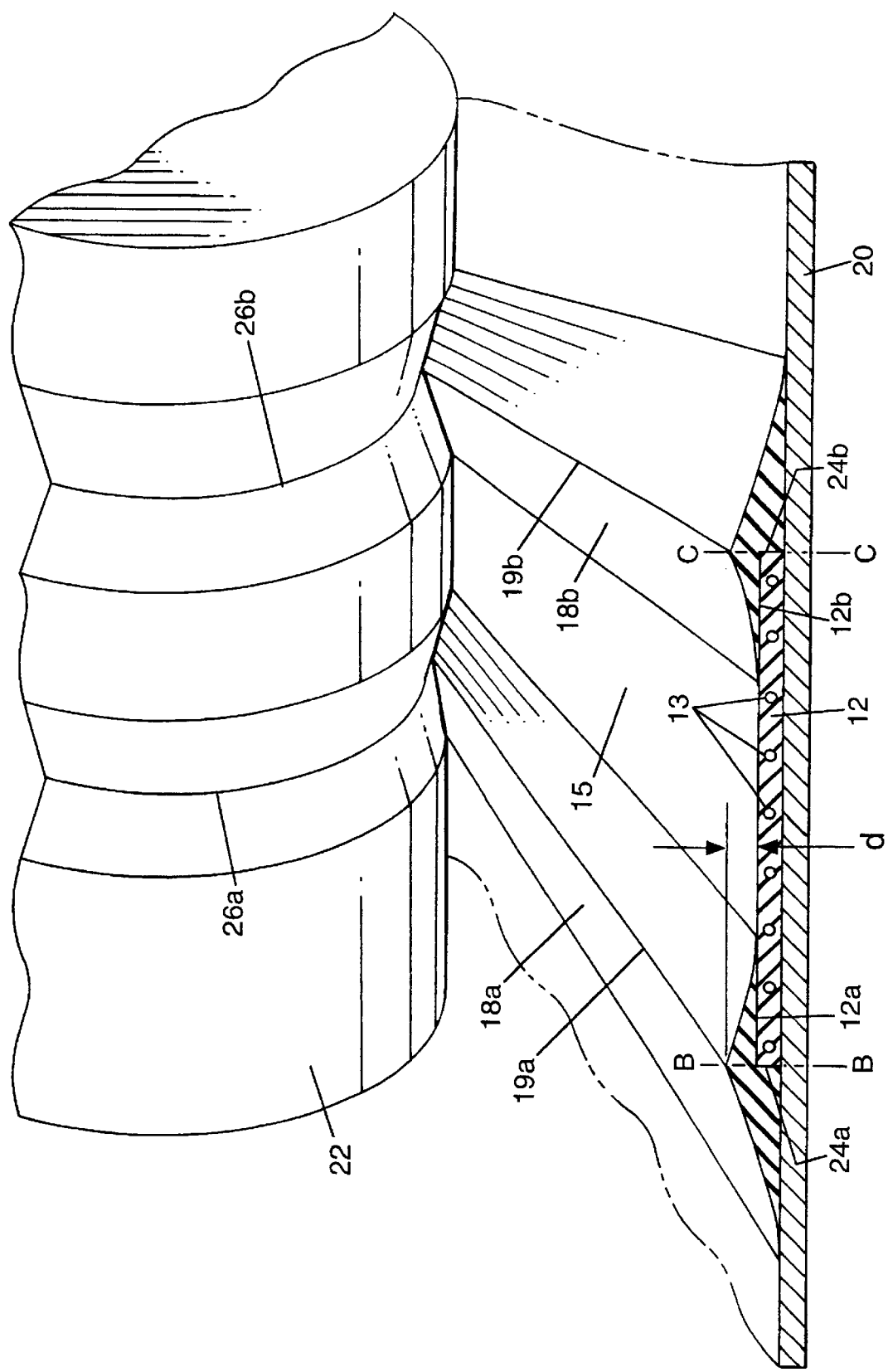
FIG. 2 is a perspective cross sectional end view of a belt assembly constructed on a conveyer belt in accordance with the present invention.

As shown in FIG. 2, each of the two wedges 18a,18b is pressed into one edge 24a,24b, respectively, of the belt material by roll former 22. The roll former 22 has spaced, V-shaped grooves 26a,26b around the circumference of the cylindrical roll former. The cross-sectional area of each V-shaped groove is equal to the cross-sectional area of the wedges 18a,18b, respectively. For a typical medium radial truck (MRT) tire, the cross-section area is approximately 0.131 square inches (0.7452 cm$^2$).

An important aspect of the invention is that the roll former presses and embeds the exposed ends of the reinforcing cords 13 into the uncured rubber of the wedge strips 18a, 18b. This tends to prevent any discontinuities between the cord ends and the rubber along the edges of the belt. Another important feature of the present invention relates to the use of the wedges to accurately produce a uniform thickness or gauge of gum rubber at the edges of the belt. This can be accomplished by locating the vertexes 19a,19b of wedges 18a,18b directly above the edge 24a,24b, respectively so that straight lines B—B and C—C pass along the edges 24a,24b and through the vertexes 19a,19b, respectively. Further, the gauge "d" is measured from the top surface 15 of the belt material 12 to the vertex 19a,19b. While a vertex is illustrated it is also within the terms of the present invention to provide a flat surface instead of the vertex. The flat surface would also be located a distance "d" from the top surface 15 of the belt material 12. Maintaining a constant gauge is very important because failure to do so creates a location where heat build and separation problems arise. Accordingly, the precise application of the wedge contributes to improved tire uniformity by eliminating variations in thickness between adjacent belts.

Referring again to FIG. 1, the belt material 12 and wedges 18a,18b are assembled by the roll former 22 with the side edges 24a,24b of the belt material pressed into and encapsulated within the uncured rubber of the wedges 18a,18b. The end sections 12a,12b of the top surface 15 of belt material 12 are covered with wedges 18a,18b. After the belt material 12 and the wedges 18a,18b are roll formed together, the resultant belt assembly is passed over anvil 32 wherein the continuous length of belt material is cut into discrete belt assemblies 30 with a conventional cutter 34. Each belt assembly 30 is cut to a length which is precisely equal to the circumference of the toroidal carcass 36 around which the belt is to be wrapped. Further, the belt material is typically cut along the length of the cords at an angle determined by the specific design of the tire. The belt assembly 30 is transported on a second conveyor 38 to a tire building drum 40 of conventional design. Then the belt assembly 30 is wrapped around the toroidal tire carcass with the wedges 18a,18b positioned radially on the inside of the belt in contact with a belt immediately therebeneath, which had been previously wrapped around the tire casing 36.

As previously noted, the teachings of the present invention are intended to be used with one or more intermediate belt assemblies on tires such as MRT tires having three or four reinforcement belts. In other words, if the tire contains three belts, the wedge strips are applied along the side edges of the second belt to form a second belt assembly. If the tire contains four belts, the wedge Strips are applied to the third belt to form a third belt assembly including a bell with wedge strips along the side edges. The second and third belts have been found to undergo a greater amount of cord angle shift as the belts pass through the footprint than the innermost or outermost reinforcement belts because the cords of the second and third reinforcement belts are at opposing angles to one another.

Figure 3:
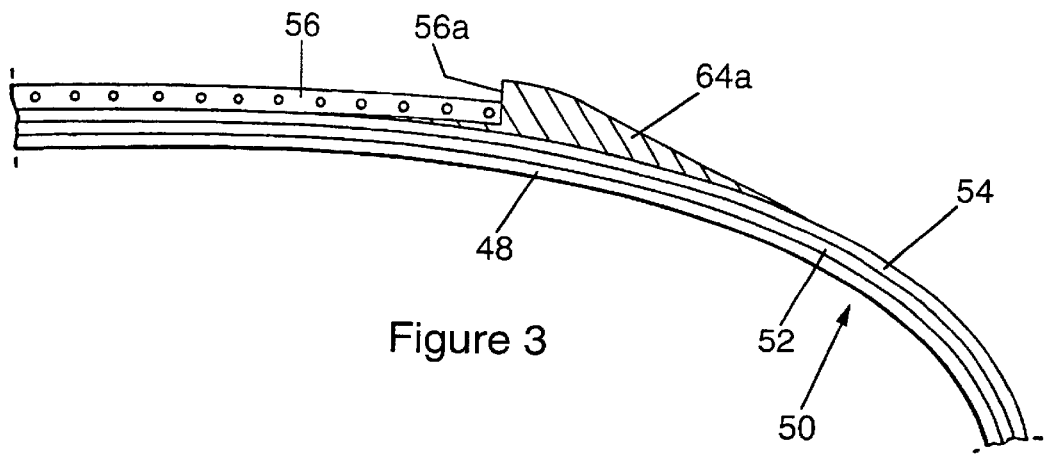
FIG. 3 is a partial cross-sectional view of a toroidal tire carcass showing a first reinforced belt positioned thereon.
Figure 4:
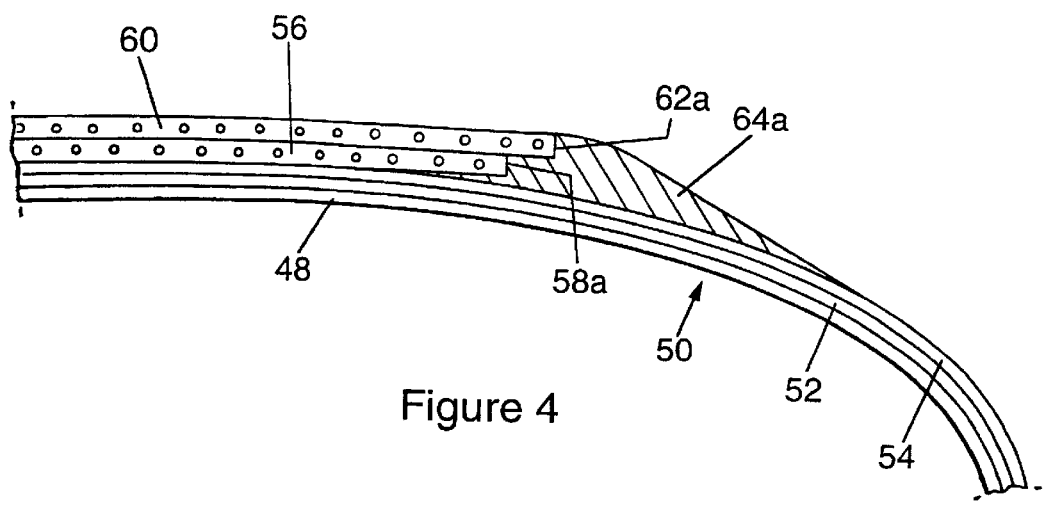
FIG. 4 is a partial cross-sectional view of the tire carcass shown in FIG. 3 with an additional first reinforced belt assembly.
Figure 5:
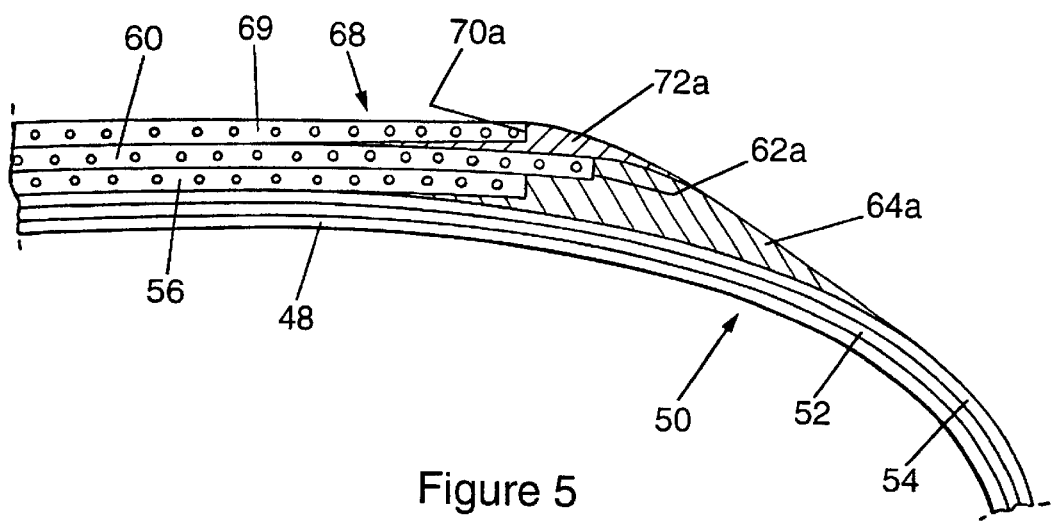
FIG. 5 is a partial cross-sectional view of the carcass shown in FIG. 4 with an additional second reinforced belt assembly.

FIGS. 3 through 5 show the arrangement of the first three belts in the construction of a truck tire having four reinforcing belts. The tire comprises a tire casing 50 composed of an inner carcass ply 52 and an outer carcass ply 54, both of which are reinforced by cords of nylon, rayon, polyesters or aramid. A liner 48 of rubber such as halobutyl, which is highly impermeable to the passage of air is on the inside of the carcass 50. The cord angle of the reinforcement cords in the carcass plies are approximately in a radial plane, that is, generally parallel to the tire axis about which the tire rotates. A tire of this construction is conventionally named a radial ply tire.

As shown in FIG. 3, the first reinforcement belt 56 on the outer carcass ply 54 does not include a wedge 18a,18b along the edges 58a,58b of the belt. Throughout FIGS. 3–6 only one side (designated as a) is shown since the other side (designated as b) is substantially identical. A shoulder wedge 64a,64b is conventionally located at either side of first belt 56 between carcass 50 and belt 56, and provides a platform for the placement of the belts during the building of the tire. The tackiness of the first belt 56 and the uncured carcass 50 keeps the first belt adhered to the tire carcass 50 during this stage of the tire building process.

FIG. 4 shows a second reinforcement belt 60 disposed on top surface of the first belt 56 with the edges 62a,62b of the second belt 60 extending beyond the edges 58a,58b of the first belt. The edges 62a,62b of belt 60 are pressed into the shoulder wedges 64a,64b substantially as shown. After the second belt 60 is wrapped around the first belt 56, the ends (not shown) are spliced together using conventional stitching rollers (not shown).

FIG. 5 shows a belt and wedge assembly 68, substantially identical to the belt assembly 30, as described before with regard to belt 12 and wedges 18a,18b, and shown in FIGS. 1 and 2, wrapped around the second belt 60 with the edges 70a,70b of the third belt 69 embedded in a second wedge 72a,72b, respectively, to form belt and wedge assembly 68. The ends of the third belt 69 and the wedges 72a,72b) are stitched to tightly adhere them together, as described before. The third belt assembly 68 is applied to the second belt 60 with wedge strips 72a,72b disposed to space the ends 70a,70b of third belt 69 a specified gauge distance from ends 62a,62b of second belt 60. Note that the wedges 72a,72b (72b not shown) are positioned against the second belt 60 to keep the edges 62a,62b,70a,70b of the two "working belts" 60 and 69, respectively, from contacting each other. The working belts 60 and 69 are applied so that their cords have equal angles with respect to the equatorial plane throughout the tire, but the cords are aligned so that the cord angles are in opposite directions to each other. The wedges 72a,72b ensure that the spacing between the edges 6a,62b of the second belt assembly 60 and the edges 70a,70b of belt assembly 68 is desirably maintained at a predetermined uniform distance of 0.110 inches (0.125 cm) to 0.112 inches (0.130 cm).

Figure 6:
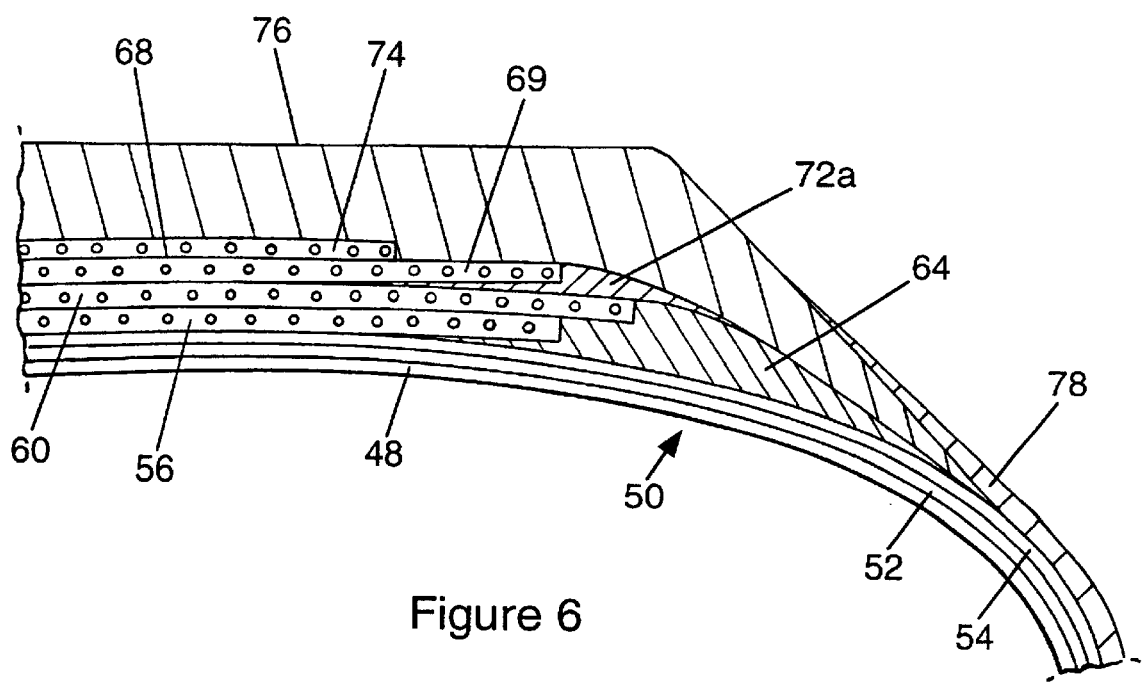
FIG. 6 is a partial cross-sectional view of a portion of a cured tire with two reinforced belt assemblies between two reinforced outer belts.

FIG. 6 shows a partial cross section of a completed tire with four reinforcement belts 56,60,68,74. The fourth belt 74 is applied on top of the third belt 68 and a tread 76 is placed radially outward from the fourth belt. Also, sidewalls 78 are provided as is conventionally known in the tire construction art. In a conventional manner, the entire structure is placed in a tire mold where the tire is cured at elevated temperatures causing the rubber to flow and fill any voids created during the tire building process, and to become vulcanized or cured into an integral unit.

By using the method and device of the present invention, the uniformity of the resultant tire can be improved while decreasing the incident of failure due to ply and belt separations caused by changes in the cord angles of the reinforcing cords in the intermediate belts located beneath the tread portion of the tire. Furthermore, the production rate for radial medium truck tires can be increased by utilizing the teachings of the present invention.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A method for constructing a cord reinforced belt assembly used in the construction of a pneumatic tire, comprising the steps of:

a) extruding a first wedge of uncured rubber along a first side edge of a cord reinforced belt on a one surface of the belt; and b) roll forming the first wedge of uncured rubber along the first side edge of the belt to embed the first side edge of the belt in the uncured rubber of the first wedge; and to shape the first wedge with a triangular cross-section such that an obtuse vertex is located directly above the first side edge of the belt.

2. The method of claim 1 including the steps of:

a) extruding a second wedge along a second side edge of the cord reinforced belt on the one surface of the belt; and b) roll forming the second wedge of uncured rubber along the second side edge of the belt to embed the second side edge of the belt in the uncured rubber of the second wedge; and to shape the second wedge with a triangular cross-section such that an obtuse vertex is located directly above the second side edge of the belt.

3. The method of claim 2 including the step of cutting the belt material and the first and second wedges to form a belt assembly having two ends.

4. The method of claim 3 including the steps of:

roll forming the first and second wedges along the first and second side edges of the belt at a temperature of between 77° C. and 115° C.

5. The method of claim 1 including the step of:

selecting the cords of the cord reinforced belt from the group consisting of steel cord, brass-plated steel cord, and cords of natural and synthetic material.

6. The method of claim 1 wherein the angle of the cords in the cord reinforced belt assembly is between 18° and 26° with respect to the equatorial plane of the tire.

7. The method of claim 6 wherein the angle of the cords in the belt assembly is 22° with respect to the equatorial plane of the tire.

8. The method of claim 2, further comprising:

when roll forming the first wedge, applying a force perpendicular to the one surface of the belt; and when roll forming the second wedge, applying a force perpendicular to the one surface of the belt.

9. The method of claim 2, further comprising:

when roll forming the first wedge, pressing and embedding exposed ends of the reinforcing cords into the first wedge; and when roll forming the second wedge, pressing and embedding exposed ends of the reinforcing cords into the second wedge.

10. The method of claim 2, further comprising:

maintaining a uniform thickness of uncured rubber at the edges of the belt.

11. The method of claim 4 including the step of roll forming at a pressure of between 1400 psi and 2200 psi.

12. A method of constructing a pneumatic tire comprising the steps of:

a) wrapping a first reinforcing belt around a tire carcass;

b) wrapping a second reinforcing belt around the first reinforcing belt such that the second reinforcing belt has cords at a first angle with respect to the equatorial plane of the tire carcass;

c) constructing a first belt assembly including a third reinforcing belt with side edges having one surface embedded into elastomeric wedges, respectively; and d) wrapping the first belt assembly around the second reinforcing belt with the elastomeric wedges positioned radially inwardly from the first belt assembly against the second belt to space side edges of the second belt from the side edges, respectively, of the third belt; and wherein the step (c) of constructing a first belt assembly comprises:

extruding wedges of uncured rubber along the side edges of the third belt; and roll forming the wedges and side edges of the third belt to embed each side edge into one of the wedges; and to shape each wedge with a triangular cross-section such that al obtuse vertex is located directly above one of the side edges.

13. The method of claim 12 including the step of extruding and roll forming each of the elastomeric wedges along one side edge of the belt at a temperature in the range of between 77° C. and 115° C.

14. The method of claim 13 including the step of selecting first, second and third reinforcing belts with an angle of the reinforcing cords in the belt between 18° and 26° with respect to the equatorial plane of the tire.

15. The method of claim 12 including the step of selecting the reinforcing cords from the group consisting of steel cord, brass-plated steel cord, and cords of natural and synthetic material.

16. The method of claim 13 including the step of roll forming at a pressure of between 1400 psi and 2200 psi.

17. The method of claim 14 including the step of orienting the reinforcing cords of the third reinforcing belt at opposing angles to the reinforcing cords of the second reinforcing belt.

* * * * *